United States Patent [19]

Drysdale

[11] Patent Number: 4,824,995
[45] Date of Patent: Apr. 25, 1989

[54] POLY-P-PHENYLAMINO CARBOXYLATE

[75] Inventor: Neville E. Drysdale, Newark, Del.

[73] Assignee: E. I. Du Pont de Nemours and Company, Wilmington, Del.

[21] Appl. No.: 193,195

[22] Filed: May 9, 1988

Related U.S. Application Data

[63] Continuation-in-part of Ser. No. 66,126, Jun. 24, 1987.

[51] Int. Cl.$^4$ ............................................. C07C 101/44
[52] U.S. Cl. ................................................... 560/44
[58] Field of Search .......................... 560/44; 528/332

[56] References Cited

U.S. PATENT DOCUMENTS 4,246,429  1/1981  Van Daele ............................. 560/44
4,492,683  1/1985  Nagpal ................................. 562/457

FOREIGN PATENT DOCUMENTS 475946  9/1969  Switzerland ........................ 562/457

OTHER PUBLICATIONS

Sprung, "A Summary of the Reactions of Aldehydes with Amines", *Chemical Review*, 26, (1940), pp. 293–338.

Muhlbacher et al., *Z. Naturforsch*, 37b, (1982), pp. 1352–1354, (Translation Included).

Lewin et al., *Flame Retardant Polymeric Materials*, Plenum Press—New York & London, vol. 1, (1975), pp. 148–152 & 196–201.

*Primary Examiner*—Bruce D. Gray
*Attorney, Agent, or Firm*—Craig H. Evans

[57] ABSTRACT

A poly-p-phenylamino carboxylate having the following structure:

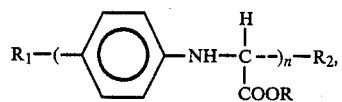

wherein n is greater than 1; R is a $C_1$ to $C_6$ alkyl group; and $R_1$ and $R_2$ are the same or different and are selected from the group:

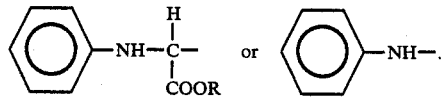

3 Claims, No Drawings

POLY-P-PHENYLAMINO CARBOXYLATE

This application is a continuation-in-part of application Ser. No. 066,126 filed June 24, 1987.

FIELD OF INVENTION

This invention relates to a new composition, poly-p-phenylamino carboxylate, having more than one repeating unit with the following structure:

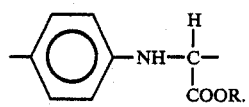

BACKGROUND AND SUMMARY OF INVENTION

Sprung in "A Summary of the Reactions of Aldehydes with Amines", *Chemical Review* 26 (1940), pages 293 to 338, discloses reactions of formaldehyde with aniline in the presence of an acid. Various formaldehyde/aniline reaction products are formed depending upon operating conditions. The one closest in structure to the compound of this invention is a polymer with repeating units of the following structure:

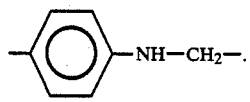

It is made by reacting aniline with formaldehyde in the presence of an equimolar quantity of strong acid. When the reaction is carried out in a neutral or slightly acid solution, Sprung teaches isolation of an anhydroformaldehyde aniline cyclic trimer.

It has now been found that when aniline is reacted with a glyoxylate, preferably a $C_1$ to $C_6$ alkyl glyoxylate and more preferably methyl or ethyl glyoxylate, instead of formaldehyde, in the presence of a catalytic quantity of acid and in a solvent that is capable of azeotropically removing water, poly-p-phenylamino carboxylate having the following structure is formed:

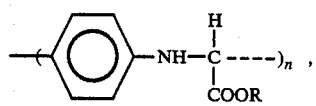

where n is greater than 1 and R is the same as the R of the glyoxylate. This is particularly surprising since one skilled in the art would expect the amine to attack the ester since it is well known in the art that an ester readily reacts with a base evolving an alcohol.

It is also surprising in view of the teaching of Muhlbacher et al. in *Z. Naturforsch,* 37b (1982), pages 1352 to 1354. Muhlbacher et al. teach the reaction of aniline and ethyl glyoxylate in a benzene solvent to produce the monomer:

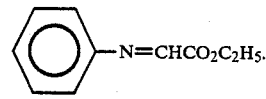

Muhlbacher et al. does not teach using an acid in the reaction.

While the new compound is defined by the repeating units and not the end groups, the end groups will be those expected by one skilled in the art. Expected end groups include:

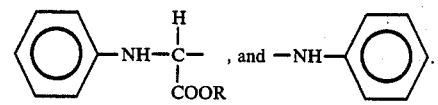

This new composition contains a large number of functionalities which will suggest a variety of potential uses to one skilled in the art. For example, the poly-p-phenylamino carboxylate should be useful in the manufacture of surfactants, thermosetting plastics and flame retardants. Surfactants most likely can be made by transesterification with fatty alcohols. Thermoplastics most likely can be made by cross-linking the carboxylate and amino functionalities of the new polymer. Flame retardants most likely would result from bromination of the phenyl group.

DETAILED DESCRIPTION OF INVENTION

The invention is a poly-p-phenylamino carboxylate having the following structure:

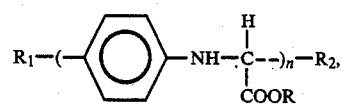

wherein n is greater than 1, preferably greater than 10; R corresponds to the R of the glyoxylate that is reacted with the aniline; and $R_1$ and $R_2$ are the same or different and are selected from the group:

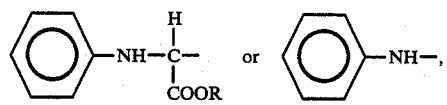

where R is as the R in the starting glyoxylate.

The preferred method for manufacturing the composition is reacting a glyoxylate with aniline in the presence of a catalytic quantity of acid and in the presence of a solvent capable of azeotropically removing water.

Preferred glyoxylates are $C_1$ to $C_6$ alkyl glyoxylates and most preferably is methyl or ethyl glyoxylates.

Preferred acids are para-toluenesulfonic acid or Nafion ® H.

Preferred solvents are toluene, carbon tetrachloride, methylene chloride, and chloroform. The most preferred is toluene.

The temperature of reaction depends on the solvent chosen and the pressure at which the reaction is carried out. The mixture is heated to reflux temperature preferably at or slightly above atmospheric pressure.

The reaction continues until the water is removed. Water evolves as a vapor phase azeotrope with the solvent and can be separated from the solvent by condensing in a trap. When the theoretical amount of water is collected in the trap, the reaction is stopped.

The gel precipitate formed during the reaction can be further processed by slurrying in a solvent such as toluene. The product can then be filtered from the solvent, washed with methanol, dried and pulverized.

The product can also be isolated by dissolving the gel in methylene chloride and causing the product to precipitate by pouring the solution into rapidly stirred diethyl ether. The resulting precipitate is filtered and dried.

Among the other uses obvious to ones skilled in the art, the poly-p-phenylamino carboxylate is useful for making flame retardant polymeric materials since it can be highly brominated. Bromination proceeds readily under standard brominating conditions, as can be seen in Example 6.

EXAMPLES

The following examples are illustrative of preparation and identification of the composition of the invention and are not intended to limit the invention.

Example 1

Preferred Method of Preparation

A mixture of 17.6 grams (g) of freshly distilled methyl glyoxylate, 18.6 g of freshly distilled aniline, and 0.1 g para-toluenesulfonic acid in 50 milliliters (ml) of toluene was placed into a 250 ml single-necked flask equipped with a stirrer and a "Dean-Stark" trap and was blanketed with nitrogen. The mixture was heated in an oil bath to reflux (boiling point of toluene at atmospheric pressure is 111° C.) and the water/toluene azeotrope was condensed in the "Dean-Stark" trap. After about 2 hours, a gel precipitate formed in the flask. The reaction was continued for an additional hour at which time 3.5 ml (verses a theoretical 3.6 ml) of water had been collected in the trap. The reaction mixture was then cooled to room temperature (about 25° C.) and 100 ml of fresh toluene was added. The precipitate which formed was then filtered, washed with methanol, pulverized and dried in vacuo for 24 hours.

Proton Magnetic Resonance with deuterated methylene chloride as that solvent for the product and Infrared Spectroscopy using a Nicolet 7199 Fourier Tranform IR and Nujol Mull were used to determine the structure of the polymer which was found to having the following repeating unit:

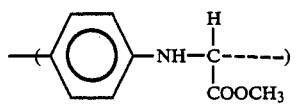

Some of the product was dissolved in tetrahydrofuran and was analyzed by Gel Permeation Chromatography and found to be polymeric. When measured against a polystyrene standard, the product was found to have a number average molecular weight (Mn) of 3270, a weight average molecular weight (Mw) of 8470 and a polydispersity (Mw/Mn) of 2.590. When measured against a poly-methyl methacrylate standard it was found to have a Mn of 1520, Mw of 5520 and a Mw/Mn of 3.634.

Based on the composition repeating unit being more analogous to that of polystyrene than that of polymethyl methacrylate, the number average molecular weight is probably closer to the 3270 than the 1520.

Example 2

The procedure of Example 1 was repeated except that 2.0 g of Nafion ® H was used as the acid catalyst in lieu of para-toluenesulfonic acid. Proton Magnetic Resonance analysis of the resulting dried polymer showed the same spectra as in Example 1.

Example 3

Using the same equipment configuration as in Example 1, a mixture of 35.2 g freshly distilled methyl glyoxylate, 37.2 g freshly distilled aniline, and 0.2 g para-toluenesulfonic acid in 200 ml carbon tetrachloride was heated to reflux (boiling point of carbon tetrachloride at atmospheric pressure is about 77° C.) while stirring under a slight positive nitrogen pressure. The mixture was refluxed for until 7.1 ml (verses a theoretical 7.2 ml) of water was collected in the "Dean-Stark" trap for solvents denser than water. When the reaction mixture was cooled to room temperature (about 25° C.), a gel separated. The solvent was decanted off and the gel was dissolved in 400 ml methylene chloride. The resulting brown solution was poured into a liter of diethyl ether and was rapidly stirred. A precipitate formed which was filtered and dried in vacuo for 48 hours. Proton Magnetic Resonance analysis of the dried product showed the same spectra as in Example 1.

Example 4

Example 3 was repeated using 200 ml of methylene chloride in lieu of the carbon tetrachloride. Proton Magnetic Resonance analysis of the dried product showed the same spectra as in Example 3.

Example 5

Example 3 was repeated using 200 ml of chloroform in lieu of the carbon tetrachloride. Proton Magnetic Resonance analysis of the dried product showed the same spectra as in Example 3.

Example 6

A mixture of 2.0 g of polymer made according to the procedure in Example 1, 8 g of bromine and 25 ml of chloroform were stirred at room temperature under nitrogen for 2 hours. When the mixture was then poured into 200 ml of diethyl ether, a yellow-orange precipitate formed. The precipitate was filtered from the liquid and dried in vacuo. Proton Magnetic Resonance showed the disappearance of the resonances attributed to a para-substituted phenyl ring, thus indicating bromination. Two samples of the product were analyzed for carbon, hydrogen and bromine. Results are as follows:

| Element | Weight Percent | |
|---|---|---|
| | Sample 1 | Sample 2 |
| Carbon | 34.99 | 35.13 |
| Hydrogen | 2.04 | 1.94 |
| Bromine | 47.76 | 48.80 |

To determine whether flame retardancy was imparted to the polymer, a small amount of the unbrominated polymer and a small amount of the brominated polymer were placed on a concrete surface. A lighted match was brought into contact with each sample. The unbrominated sample burned with the evolution of a black sooty smoke. The brominated sample did not burn but the color of the surface became black.

I claim:

1. A poly-p-phenylamino carboxylate having the following structure:

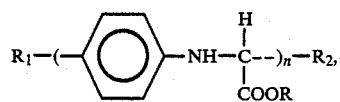

wherein n is greater than 1; R is a $C_1$ to $C_6$ alkyl group; and $R_1$ and $R_2$ are the same or different and are selected from the group:

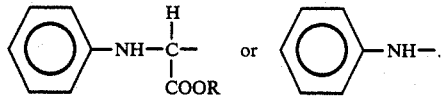

2. The poly-p-phenylamino carboxylate of claim 1 wherein n is greater than 10.

3. The poly-p-phenylamino carboxylate of claim 1 wherein R is a methyl or ethyl group.

* * * * *